No. 647,924.  
W. H. KENNEDY.  
PULLEY FOR OVERHEAD TELEPHONE CABLES.  
(Application filed Mar. 7, 1900.)  
Patented Apr. 17, 1900.
(No Model.)
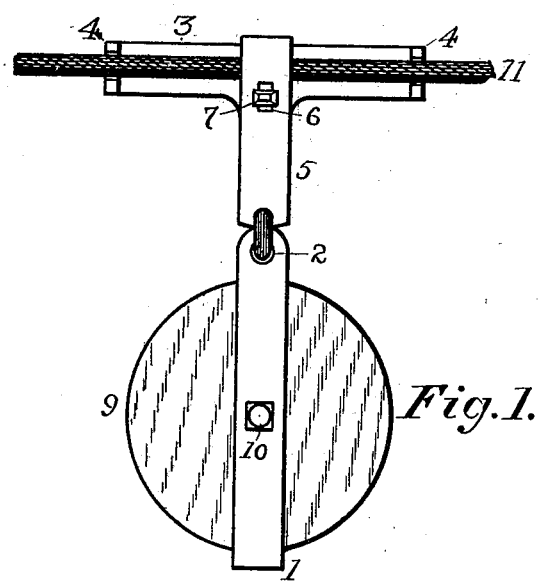
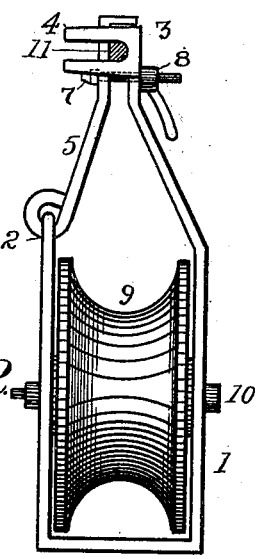
Fig.1. Fig.2.
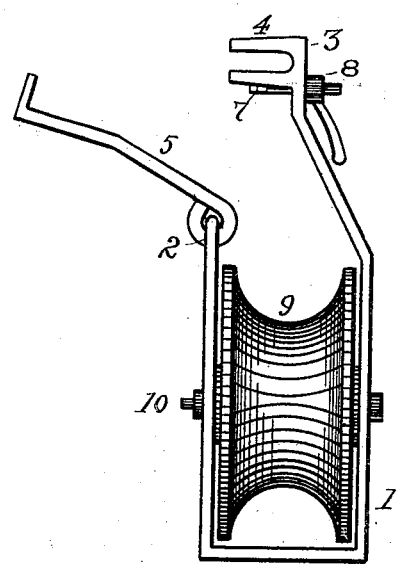
Fig.3.
Witnesses:  
Bessie Crook.
Inventor:  
William H. Kennedy,  
by Humphrey & Humphrey,  
his attorneys.
THE NORRIS PETERS CO., PHOTO-LITHO., WASHINGTON, D. C.

UNITED STATES PATENT OFFICE.

WILLIAM H. KENNEDY, OF AKRON, OHIO, ASSIGNOR OF ONE-HALF TO DAYTON A. DOYLE, OF SAME PLACE.

PULLEY FOR OVERHEAD TELEPHONE-CABLES.

SPECIFICATION forming part of Letters Patent No. 647,924, dated April 17, 1900.

Application filed March 7, 1900. Serial No. 7,630. (No model.)

*To all whom it may concern:*

Be it known that I, WILLIAM H. KENNEDY, a citizen of the United States, residing at Akron, in the county of Summit and State of Ohio, have invented a certain new and useful Improvement in Pulleys for Overhead Telephone-Cables, of which the following is a specification.

My invention has relation to improvements in devices for stringing overhead cables for telephone and other electric wires. These cables ordinarily consist of a number of insulated metallic wires grouped together and covered with an envelop of lead in the form of a tube, and where an overhead system of wires is used these cables are supported from a heavy wire or wire rope extending between the poles erected for that purpose by hooks attached at intervals to said wire or rope. In placing these cables in position great difficulty has been found in drawing them to position below the supporting wire or cable by reason of their great weight and the resistance at each cross-arm and post.

The object of my invention is to provide a simple and effective device by which these cables may be easily and rapidly strung to place and with a comparatively-small power.

To the aforesaid object my invention consists in the peculiar and novel construction, arrangement, and combination of parts hereinafter described and then specifically pointed out in the claims, reference being had to the accompanying drawings, forming a part of this specification.

In the accompanying drawings, in which similar reference-numerals indicate like parts in the different views, Figure 1 is a front elevation of my improved pulley closed; Fig. 2, an end elevation of the same, and Fig. 3 a similar view with the pulley open to admit the cable.

Referring to the figures, 1 is a metallic bar bent to form three sides of a rectangle, with one end—the shorter—perforated at 2 and the other and longer end bent inward and thence up parallel with the sides of the rectangle and bearing, secured thereto by welding or other means, a cross-arm 3, with the ends 4 bent at a right angle toward the shorter side and forked. In the hole at 2 is turned the reduced end of a bar 5, otherwise of like dimensions with the bar 1, shaped like the upper part of said bar and having the upper end bent over to rest on the cross-arm 3. In the bar 5 is a slot 6 and opposite this in the bar 1 a hole in which rests a T-headed bolt 7, screw-threaded and on which runs a hand-nut 8. In the rectangular part of the bar 1 is a grooved pulley 9, mounted on a bolt 10.

In operation the forked ends 4 inclose the stay or supporting wire 11. The cable is then led over the pulley 9 and the bar 5 swung up against the cross-arm 3 and locked by the T-headed bolt 7, which is passed through the slot 6 and turned crosswise, as shown in Fig. 1.

I claim as my invention—

1. An improved pulley for stringing overhead electric cables consisting of a metallic, three-sided, rectangular frame having one end longer than the other, with a cross-bar on its longer end with inwardly-bent forked ends; a free bar hinged to its shorter end arranged to engage the cross-bar between its forked ends having a slot; a bolt in a hole in the longer end with a T-head to enter the slot in the hinged end, and a nut to draw said bolt tight and a grooved pulley mounted in said frame, substantially as shown and described.

2. An improved pulley for stringing overhead electric cables consisting of a metallic three-sided rectangular frame having one end longer than the other, the longer end bent inward with a cross-bar at its top having inwardly-bent forked ends; a free bar hinged to its shorter end arranged to engage the cross-bar between its forked ends having a slot and its end bent to rest on said cross-bar, and a bolt in a hole in the longer end with a T-head to enter the slot in the hinged end, a nut to draw said bolt tight, and a grooved pulley mounted in said frame substantially as shown and described.

In testimony that I claim the above I hereunto set my hand in the presence of two subscribing witnesses.

WILLIAM H. KENNEDY.

In presence of—
C. P. HUMPHREY,
C. E. HUMPHREY.